(12) United States Patent
Dommety

(10) Patent No.: US 7,512,088 B1
(45) Date of Patent: Mar. 31, 2009

(54) ROUTING DATA PACKETS TO A MOBILE NODE

(75) Inventor: Gopal K. Dommety, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 993 days.

(21) Appl. No.: 10/193,983

(22) Filed: Jul. 12, 2002

(51) Int. Cl. *H04Q 7/00* (2006.01)

(52) U.S. Cl. .................. 370/328; 455/433

(58) Field of Classification Search .............. None
See application file for complete search history.

(56) References Cited

U.S. PATENT DOCUMENTS

| | | | |
|---|---|---|---|
| 6,137,791 A | 10/2000 | Frid et al. | 370/352 |
| 6,195,705 B1 | 2/2001 | Leung | 709/245 |
| 6,445,922 B1 | 9/2002 | Hiller et al. | 455/433 |
| 6,452,920 B1 * | 9/2002 | Comstock | 370/349 |
| 6,466,964 B1 | 10/2002 | Leung et al. | 709/202 |
| 6,487,605 B1 | 11/2002 | Leung | 709/245 |
| 6,542,992 B1 * | 4/2003 | Peirce et al. | 713/153 |
| 6,665,537 B1 | 12/2003 | Lioy | 455/435 |
| 6,973,057 B1 * | 12/2005 | Forslow | 370/328 |
| 6,992,994 B2 * | 1/2006 | Das et al. | 370/328 |
| 7,284,068 B1 * | 10/2007 | Ramalho | 709/245 |
| 2001/0053694 A1 * | 12/2001 | Igarashi et al. | 455/433 |
| 2002/0018456 A1 * | 2/2002 | Kakemizu et al | 370/338 |
| 2002/0054584 A1 * | 5/2002 | Dempo | 370/338 |
| 2002/0086674 A1 * | 7/2002 | Jung | 455/436 |
| 2004/0047322 A1 * | 3/2004 | O'Neill | 370/338 |
| 2005/0063352 A1 * | 3/2005 | Amara et al. | 370/338 |

* cited by examiner

*Primary Examiner*—Firmin Backer
*Assistant Examiner*—Clemence Han
(74) *Attorney, Agent, or Firm*—Baker Botts L.L.P.

(57) ABSTRACT

Routing data packets to a mobile node includes registering a mobile node with a home agent associated with the mobile node. The home agent establishes that the mobile node has moved from a first network to a second network, and determines a foreign access router of the second network, where the mobile node communicates through the foreign access router. A mobility binding table is updated with a binding entry associated with the foreign access router. Data packets destined for the mobile node are forwarded to the mobile node in accordance with the updated mobility binding table.

12 Claims, 2 Drawing Sheets

ROUTING DATA PACKETS TO A MOBILE NODE

TECHNICAL FIELD OF THE INVENTION

This invention relates in general to telecommunication networks, and more particularly to routing data packets to a mobile node.

BACKGROUND OF THE INVENTION

Mobile Internet Protocol (IP) may be used to route data packets to a mobile node as the mobile node roams from network to network. Some network elements, however, do not support mobile IP. Consequently, using mobile IP to route data packets to mobile nodes has posed challenges.

SUMMARY OF THE INVENTION

In accordance with the present invention, disadvantages and problems associated with packet data networks have been substantially reduced or eliminated.

According to one embodiment of the present invention, routing data packets to a mobile node includes registering a mobile node with a home agent associated with the mobile node. The home agent establishes that the mobile node has moved from a first network to a second network, and determines a foreign access router of the second network, where the mobile node communicates through the foreign access router. A mobility binding table is updated with a binding entry associated with the foreign access router. Data packets destined for the mobile node are forwarded to the mobile node in accordance with the updated mobility binding table.

Certain embodiments of the invention may provide one or more technical advantages. A technical advantage of one embodiment may include a home agent that performs mobile IP functions so that other network elements do not need to support mobile IP. The home agent determines that a mobile node has moved and updates a mobility binding table in order to forward data packets to the mobile node.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
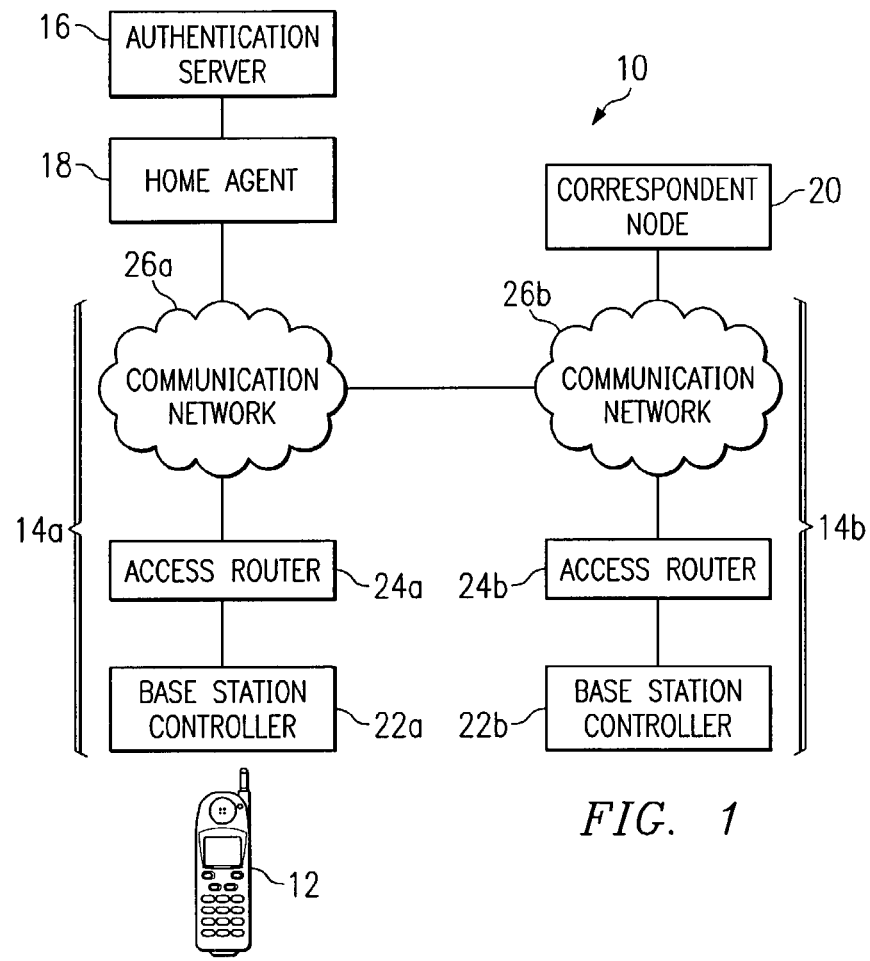
FIG. 1 illustrates one embodiment of a system for routing data packets to a mobile node that roams from one location to another location.

FIG. 1 illustrates one embodiment of a system 10 for routing data packets to a mobile node 12 that roams from one location to another location. System 10 includes a home agent 18 that determines that mobile node 12 has moved to a new location, updates a mobility binding table according to the new location, and forwards the data packets to the mobile node 12 using the updated mobility binding table.

Mobile node 12 may comprise, for example, a personal digital assistant, a mobile telephone, or any other device suitable for communicating data packets to system 10. Mobile node 12 may support, for example, simple Internet Protocol (IP), mobile IP, or any other suitable communication protocol. Mobile node 12 may utilize, for example, code division multiple access (CDMA), time division multiple access (TDMA), global system for mobile communications (GSM), analog mobile phone service (AMPS), narrow band analog mobile phone service (NAMPS), or any other suitable mobile communication technology. A call from mobile node 12 may comprise data packets such as voice, data, video, multimedia, or other type of data packet, or any combination of the preceding.

System 10 may include networks 14, an authentication server 16, and a home agent 18, which are used to communicate data packets between mobile node 12 and a correspondent node 20. A network 14 communicates data packets from mobile node 12 located in a coverage area serviced by network 14. As mobile node 12 moves to different coverage areas, other networks 14 servicing the coverage areas communicate the data packets from mobile node 12. Mobile node 12 has a home network 14a with home agent 18 that tracks the location of mobile node 12 and forwards data packets to mobile node 12 as mobile node 12 roams to a foreign network 14b. The data packets are forwarded through an access router 24b of foreign network 14b.

According to one embodiment, each network 14 may include a base station controller 22, an access router 24, and a communication network 26. As used in this document, "each" refers to each member of a set or each member of a subset of the set. Base station controller 22 provides an interface between mobile node 12 and access router 24. Base station controller 22 may route a call from mobile node 12 through a base station. The wireless link between mobile node 12 and access router 24 typically comprises a radio frequency link that may be cellular in network organization.

Access router 24 establishes a communication session, for example, a point-to-point session, with mobile node 12 in order to provide mobile node 12 with access to network 14. In the illustrated example, access router need not include mobile IP or proxy mobile IP capabilities. Access router 22 may comprise any suitable router that provides connectivity to a mobile device. Access router 22 may comprise, for example, a code division multiple access packet data serving node (CDMA-PDSN), a general packet radio service gateway serving node (GPRS-GSN), or a wireless local area network access zone router (WLAN-AZR). An access router 24b of a foreign network 14b may communicate data packets from mobile node 12 while mobile node 12 is in foreign network 14b.

Communication network 26 may comprise a public switched telephone network, a public or private data network, the Internet, a wired or wireless network, a local, regional, or global communication network, other suitable communication link, or any combination of the preceding.

Authentication server 16 authenticates mobile node 12 before providing services to mobile node 12. Authentication server 16 may also perform authorization and accounting functions. The procedures may be performed using keyed MD5 hashes, which cover registration requests and replies. Authentication server 16 receives and sends authentication information through home agent 24.

Home agent 18 comprises a router of mobile node 12's home network 14a that tracks the location of mobile node 12 and provides mobile IP service to mobile node 12. Home agent 18 determines that mobile node 12 has moved to a new location, updates a mobility binding table according to the location, and forwards the data packets to the mobile node 12 using the updated mobility binding table. The updated mobility binding table identifies mobile node 12's point of attachment to home network 14a and is used to forward data packets to roaming mobile node 24b. Home agent 18 intercepts and transparently forwards data packets to mobile node 12 as mobile node 12 roams beyond the boundary of home network 14a. Home agent 18 is described in more detail with reference to FIG. 2.

Correspondent node 20 may comprise any suitable node with which mobile node 12 may communicate or hold an interactive session, for example, a computer such as an email server or a messaging server. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device.

In operation, mobile node 12 roams from home network 14a to foreign network 14b. Home agent 18 determines that mobile node 12 has moved to a new location in foreign network 14b and updates a mobility binding table in accordance with the new location. Correspondent node 20 sends data packets destined for mobile node 12. The data packets are routed to home network 14a of mobile node 12 in accordance with the updated mobility binding table.

Figure 2:
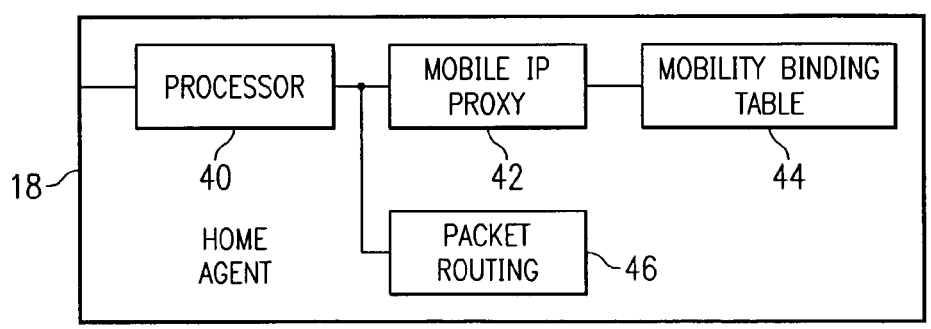
FIG. 2 illustrates one embodiment of the home agent of the system of FIG. 1.

FIG. 2 illustrates one embodiment of home agent 18 of system 10 of FIG. 1. Home agent 18 may include a processor 40, a mobile IP proxy module 42, a mobility binding table 44, and a packet routing module 46. Processor 40 detects that mobile node 12 has moved and notifies mobile IP proxy module 42. Processor 40 may determine that mobile node 12 has moved by, for example, receiving an authentication request or other signals such as Layer 2 signals sent by mobile node 12.

Mobile IP proxy module 42 determines the location of mobile node 12, and records the location in mobility binding table 44. According to one embodiment, mobile IP proxy module 42 receives an authentication request that indicates mobile node 12 is communicating through access router 24b. Mobility binding table 44 may be updated with, for example, the IP address of access router 24b.

Mobility binding table 44 includes a binding entry that tracks the location of mobile node 12 by recording the association of a home address of mobile node 12 with a current care-of address of mobile node 12. During registration of a mobile node 12, mobility binding table 44 is updated by creating, modifying, or deleting the binding entry of the mobile node 12.

Packet routing module 46 prepares data packets for transmission to correspondent node 20. According to one embodiment, packet routing module 46 establishes a tunnel to access router 24b through which mobile node 12 is communicating. Packet routing module 46 encapsulates data packets and sends them via the tunnel to access router 24b. Access router 24b de-encapsulates the data packets and sends them to mobile node 12.

Packet routing module 46 may, however, route data in any suitable manner. For example, packet routing module 46 may host a route to mobile node 12. A point-to-point communication link is established between packet routing module 46 and mobile node 12, and data packets are transmitted along the communication link.

In operation, home agent 18 determines that mobile node 12 has moved to a new location and updates mobility binding table 44 accordance with the new location. Home agent 18 receives data packets having the home address of mobile node 12, and routes the data packets to mobile node 12 using an updated mobility binding table 44. The change of location is only known to home agent 18, and other devices continue to communicate with mobile node 12 through home agent 18.

Figure 3:
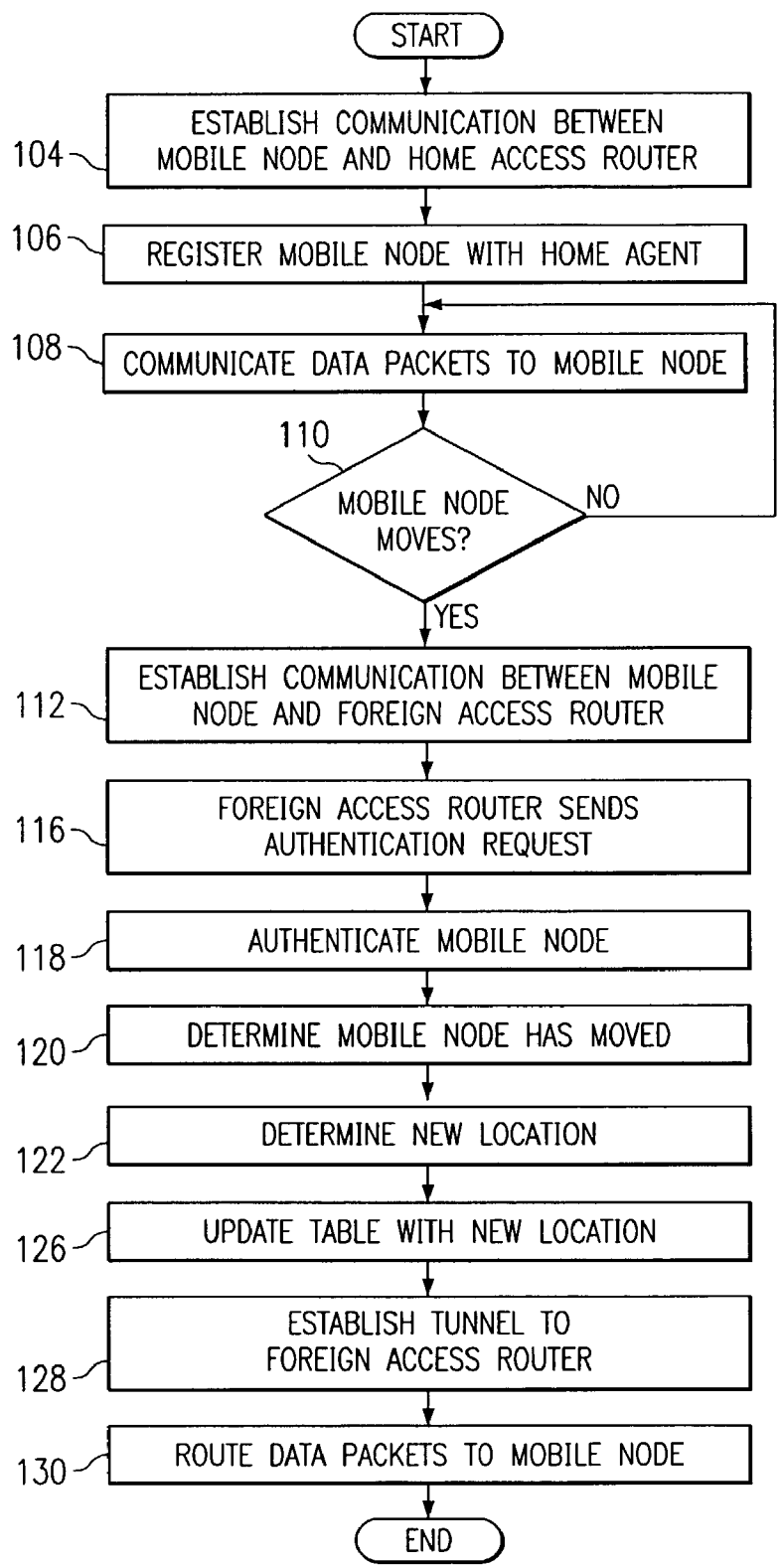
FIG. 3 illustrates one embodiment of a method for forwarding data packets to a mobile node that moves from one location to another location.

FIG. 3 illustrates one embodiment of a method for forwarding data packets to mobile node 12 that moves from one location to another location. Communication is established between mobile node 12 and home access router 24a of home network 14a at step 104. Communication may be established according to, for example, an extensible authorization protocol (EAP) or point-to-point (PPP) authentication.

Mobile node 12 is registered with home agent 18 at step 106. During registration, mobile node 12 sends a registration request. When home agent 18 receives the registration request, home agent 18 determines, for example, if the authentication hash of the request is valid, if the timestamp of the request is within an acceptable range, and if the request can be honored in terms of resources as well as options. Mobility binding table 44 is updated with the location of mobile node 12. Home agent 18 sends a registration reply to mobile node 12. Data packets are communicated to mobile node 12 at step 108.

Mobile node 12 may move to a different network 14b at step 110. If mobile node 12 does not move to a different network 14b, the method returns to step 108, where home agent 18 continues to communicate data packets to mobile node 12. If mobile node 12 moves to a different network 14b, the method proceeds to step 112. Mobile node 12 detects that the point-of-attachment to a network has changed. Communication is established between mobile mode 12 and foreign access router 24b of foreign network 14b at step 112.

Foreign access router 24b sends an authentication request to authentication server 16 via home agent 18 at step 116. Mobile node 12 is authenticated by authentication server 16 at step 118 in response to the authentication request. Authentication server 16 may perform any suitable authentication procedures.

Home agent 18 determines that mobile node 12 has moved at step 120. Home agent 18 may determine that mobile node 12 has moved by, for example, receiving an authentication request from foreign access router 24b. Alternatively, home agent 18 may determine that mobile node 12 has moved from Layer 2 signals.

The new location of mobile node 12 is determined at step 122. The authentication request may indicate that mobile node 12 is communicating through foreign access router 24b. Home agent 18 may allocate a care-of address to mobile node 12. The care-of address identifies mobile node 12's topological point of attachment and is used to route data packets to roaming mobile node 12. For example, the care-of address may comprise the IP address of foreign access router 24b.

Mobility binding table 44 is updated with the new location at step 126. Mobility binding table 44 may map the home address of mobile node 12 to the care-of address of mobile node 12 in order to forward data packets to mobile node 12. When a binding entry is added to mobility binding table 44, home agent 18 may send a gratuitous address resolution protocol on mobile node 12's home network 14a so that directly connected devices may continue to communicate with mobile node 12 through home agent 18. While mobile node 12 is registered with home agent 18, home agent 18 proxies for the home address of mobile node 12 and tunnels packets to mobile node 12 using the care of address in mobility binding table 44.

A tunnel between home agent 18 and foreign access router 24b is established at step 128. Tunneling may use IP encapsulation within IP (IP-in-IP) protocol specified in IETF Request for Comment 2003 or a generic routing encapsulation (GRE) tunneling protocol specified in IETF Request for Comment 1701. The tunnel is used to forward data packets to mobile node 12 at step 130. Home agent 18 encapsulates the data packets, which are sent via the tunnel to foreign access router 24b. Foreign access router 24b de-encapsulates the data packets and delivers the data to mobile node 12. After forwarding the data packets, the method terminates.

Steps of the method may be omitted, added, or modified without departing from the scope of the invention. For example, home agent 18 may host a route to mobile node 12 at step 128 to route data packets to mobile node 12 instead of establishing a tunnel to foreign access router 24b.

Certain embodiments of the invention may provide one or more technical advantages. A technical advantage of one embodiment may include a home agent that performs mobile IP functions so that other network elements do not need to support mobile IP. The home agent determines that a mobile node has moved and updates a mobility binding table in order to forward data packets to the mobile node.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for routing data packets to a mobile node, comprising:
    registering the mobile node with a home agent associated with the mobile node, the mobile node having a home address;
    receiving at the home agent a plurality of Layer 2 signals from the mobile node;
    establishing at the home agent that the mobile node has moved from a first network to a second network, the movement established from the Layer 2 signals;
    determining at the home agent a foreign access router of the second network, the determining independent of the foreign access router being registered with the home agent, the mobile node communicating through the foreign access router;
    updating a mobility binding table with a binding entry associating the home address with the foreign access router;
    sending a gratuitous address resolution protocol from the home agent to allow a plurality of devices to communicate with the mobile node through the home agent; and
    proxying, by the home agent, for the home address to forward a plurality of data packets from the devices to the mobile node in accordance with the updated mobility binding table.

2. The method of claim 1, wherein determining at the home agent the foreign access router of the second network comprises:
    receiving an authentication request sent from the mobile node; and
    determining the foreign access router from the authentication request.

3. The method of claim 1, wherein the binding entry comprises an Internet protocol address associated with the foreign access router.

4. The method of claim 3, wherein forwarding a plurality of data packets destined for the mobile node to the mobile node in accordance with the updated mobility binding table comprises:
    establishing a tunnel with the foreign access router;
    encapsulating the data packets; and
    sending the encapsulated data packets to the foreign access router using the tunnel.

5. The method of claim 1, wherein forwarding a plurality of data packets destined for the mobile node to the mobile node in accordance with the updated mobility binding table comprises:
    establishing a point-to-point communication link with the mobile node; and
    sending the data packets to the mobile node using the point-to-point communication link.

6. An apparatus for routing data packets to a mobile node, comprising:
    a processor operable to:
        register the mobile node, the mobile node having a home address; and
        receive a plurality of Layer 2 signals from the mobile node;
        establish that the mobile node has moved from a first network to a second network, the movement established from the Layer 2 signals;
    a proxy module coupled to the processor and operable to:
        determine a foreign access router of the second network, the determination independent of the foreign access router being registered with the home agent, the mobile node communicating through the foreign access router;
        update a mobility binding table with a binding entry associating the home address with the foreign access router; and
        send a gratuitous address resolution protocol to allow a plurality of devices to communicate with the mobile node through the home agent by proxying for the home address; and
    a packet routing module coupled to the processor and operable to forward a plurality of data packets destined for the mobile node to the mobile node in accordance with the updated mobility binding table.

7. The apparatus of claim 6, wherein the proxy module is operable to determine the foreign access router of the second network by:
    receiving an authentication request sent from the mobile node; and
    determining the foreign access router from the authentication request.

8. The apparatus of claim 6, wherein the binding entry comprises an Internet protocol address associated with the foreign access router.

9. The apparatus of claim 6, wherein the packet routing module is operable to forward a plurality of data packets destined for the mobile node to the mobile node in accordance with the updated mobility binding table by:
    establishing a tunnel with the foreign access router;
    encapsulating the data packets; and
    sending the encapsulated data packets to the foreign access router using the tunnel.

10. The apparatus of claim 6, wherein the packet routing module is operable to forward a plurality of data packets destined for the mobile node to the mobile node in accordance with the updated mobility binding table by:
  establishing a point-to-point communication link with the mobile node; and
  sending the data packets to the mobile node using the point-to-point communication link.

11. A method for routing data packets to a mobile node, comprising:
  means for registering the mobile node with a home agent associated with the mobile node, the mobile node having a home address;
  means for receiving at the home agent a plurality of Layer 2 signals from the mobile node;
  means for establishing at the home agent that the mobile node has moved from a first network to a second network, the movement established from the Layer 2 signals:
  means for determining at the home agent a foreign access router of the second network, the determining independent of the foreign access router being registered with the home agent, the mobile node communicating through the foreign access router;
  means for updating a mobility binding table with a binding entry associating the home address with the foreign access router;
  means for sending a gratuitous address resolution protocol from the home agent to allow a plurality of devices to communicate with the mobile node through the home agent; and
  means for proxying, by the home agent, for the home address to forward a plurality of data packets from the devices to the mobile node in accordance with the updated mobility binding table.

12. A method for routing data packets to a mobile node, comprising:
  registering the mobile node with a home agent associated with the mobile node, the mobile node having a home address;
  receiving at the home agent a plurality of Layer 2 signals from the mobile node;
  establishing at the home agent that the mobile node has moved from a first network to a second network, the movement established from the Layer 2 signals;
  determining at the home agent a foreign access router of the second network by receiving an authentication request sent from the mobile node, the mobile node communicating through the foreign access router;
  updating a mobility binding table with a binding entry associating the home address with the foreign access router, the binding entry comprising an Internet protocol address associated with the foreign access router;
  sending a gratuitous address resolution protocol from the home agent to allow a plurality of devices to communicate with the mobile node through the home agent; and
  proxying, by the home agent, for the home address to forward a plurality of data packets from the devices to the mobile node in accordance with the updated mobility binding table by establishing a tunnel with the foreign access router, encapsulating the data packets, and sending the encapsulated data packets to the foreign access router using the tunnel.

* * * * *